(12) United States Patent
Christ

(10) Patent No.: US 8,371,566 B2
(45) Date of Patent: Feb. 12, 2013

(54) ANTI-TIPPING DIE TOOL HOLDER

(76) Inventor: Eric J. Christ, Butler, NJ (US)

( * ) Notice: Subject to any disclaimer, the term of this patent is extended or adjusted under 35 U.S.C. 154(b) by 776 days.

(21) Appl. No.: 12/456,384

(22) Filed: Jun. 15, 2009

(65) Prior Publication Data

US 2010/0313626 A1    Dec. 16, 2010

(51) Int. Cl.
| | |
|---|---|
| *B25B 1/02* | (2006.01) |
| *B25B 5/02* | (2006.01) |
| *B25B 1/00* | (2006.01) |
| *B25B 5/08* | (2006.01) |
| *B25B 5/10* | (2006.01) |
| *B25B 5/00* | (2006.01) |
| *B23Q 3/00* | (2006.01) |
| *B23Q 15/00* | (2006.01) |
| *B23P 21/00* | (2006.01) |

(52) U.S. Cl. ........ 269/164; 269/156; 269/236; 269/246; 29/714; 29/468

(58) Field of Classification Search ............... 269/164, 269/156, 236, 246; 29/714, 407, 468; 404/6
See application file for complete search history.

(56) References Cited

U.S. PATENT DOCUMENTS

| 4,201,376 | A | * | 5/1980 | Philips | 269/156 |
| 5,005,813 | A | * | 4/1991 | Lawrence | 269/236 |
| 5,547,304 | A | * | 8/1996 | Cascio | 403/13 |
| 5,953,804 | A | * | 9/1999 | Dragotta | 29/407.1 |
| 6,179,279 | B1 | * | 1/2001 | Asai et al. | 269/164 |
| 6,758,627 | B2 | * | 7/2004 | King | 404/6 |
| 6,880,237 | B2 | * | 4/2005 | Kosuge et al. | 29/714 |

* cited by examiner

*Primary Examiner* — Lee D Wilson
*Assistant Examiner* — Alvin Grant
(74) *Attorney, Agent, or Firm* — Drinker Biddle & Reath LLP

(57) ABSTRACT

An anti-tipping clamp that is used as an intermediary support for a die tool. The clamp includes a body with a rail engagement section designed to engage with a rail on a conventional forming machine for securing the clamp to the rail. The clamp also includes a die tool holding section with two spaced apart lateral arms that extend upward from a body and which provide support for a die tool.

14 Claims, 5 Drawing Sheets

ANTI-TIPPING DIE TOOL HOLDER

FIELD OF INVENTION

The present invention relates to tool clamps and more particularly to a clamp or holder for holding a tool die during a manufacturing process and reducing the likelihood of the tool tipping during use.

BACKGROUND

During a conventional manufacturing process for making metal and/or plastic products, tool dies are typically placed on rails to hold a product in place during a forming process. A conventional tool die is shown in FIG. 1 and includes a die portion 2 configured to hold a product and two depending legs 4 designed to engage the sides of the rails on a conventional European style 2V Die Rail on a tooling machine. The legs are designed to prevent tipping of the die off of the rail by providing a lateral bearing surface that contacts the rail during tipping.

Although conventional die tools are designed to inhibit tipping, tipping can still occur if a lateral force, such as a workers arm brushing against the tool, is sufficient to lift one of the legs over the side edge of the rail. It is not uncommon to have a tool knocked off of a rail during a daily forming operation. The loss associated with broken dies can become excessive over time.

SUMMARY OF THE INVENTION

The present invention relates to an anti-tipping clamp that is used as an intermediary support for a die tool. The clamp is designed to engage with a rail on a conventional European-style tooling machine, for securing the clamp to the rail. The clamp also includes lateral arms that extend upward from a base and which provide side supports for a die tool.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention there is shown in the drawings various forms which are presently preferred; it being understood, however, that this invention is not limited to the precise arrangements and instrumentalities particularly shown.

DETAILED DESCRIPTION OF THE EMBODIMENTS

Figure 1:
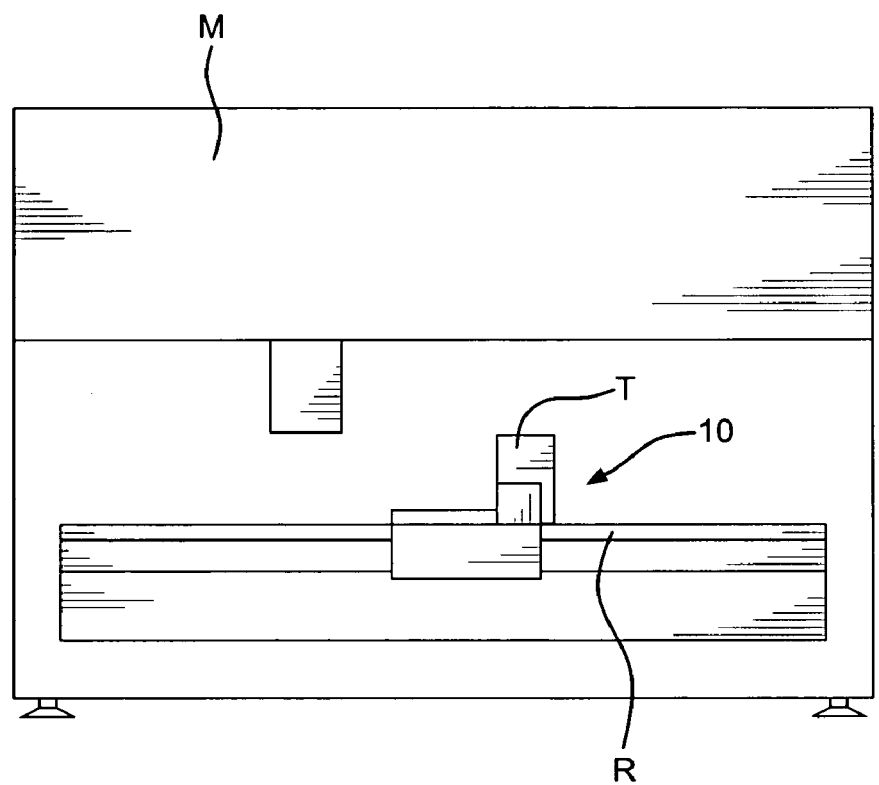
FIG. 1 is a side view of an anti-tipping clamp according to the present invention illustrating the clamp on a prior art forming machine.
Figure 2:
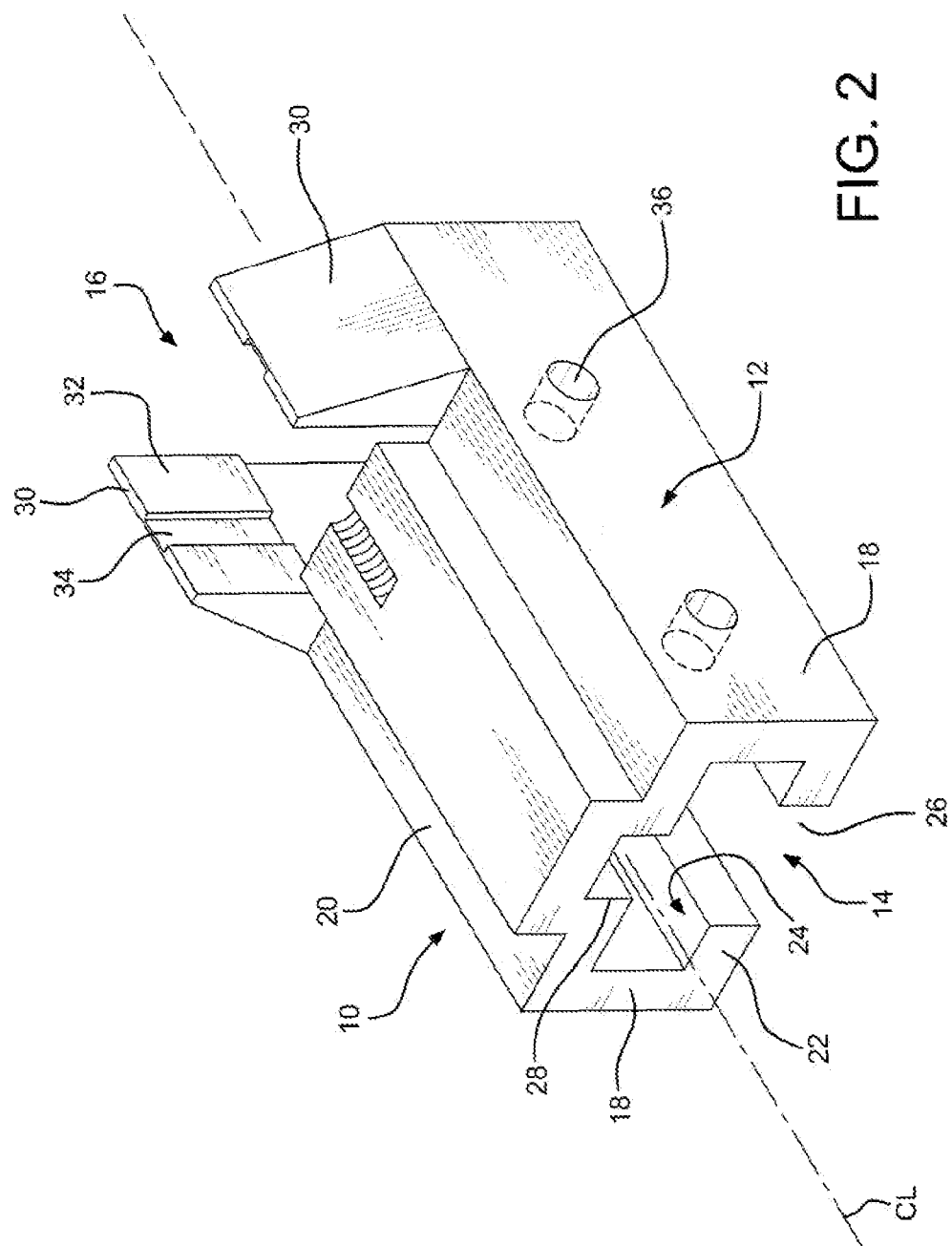
FIG. 2 is an isometric view of one embodiment of the anti-tipping clamp according to the present invention.
Figure 3:
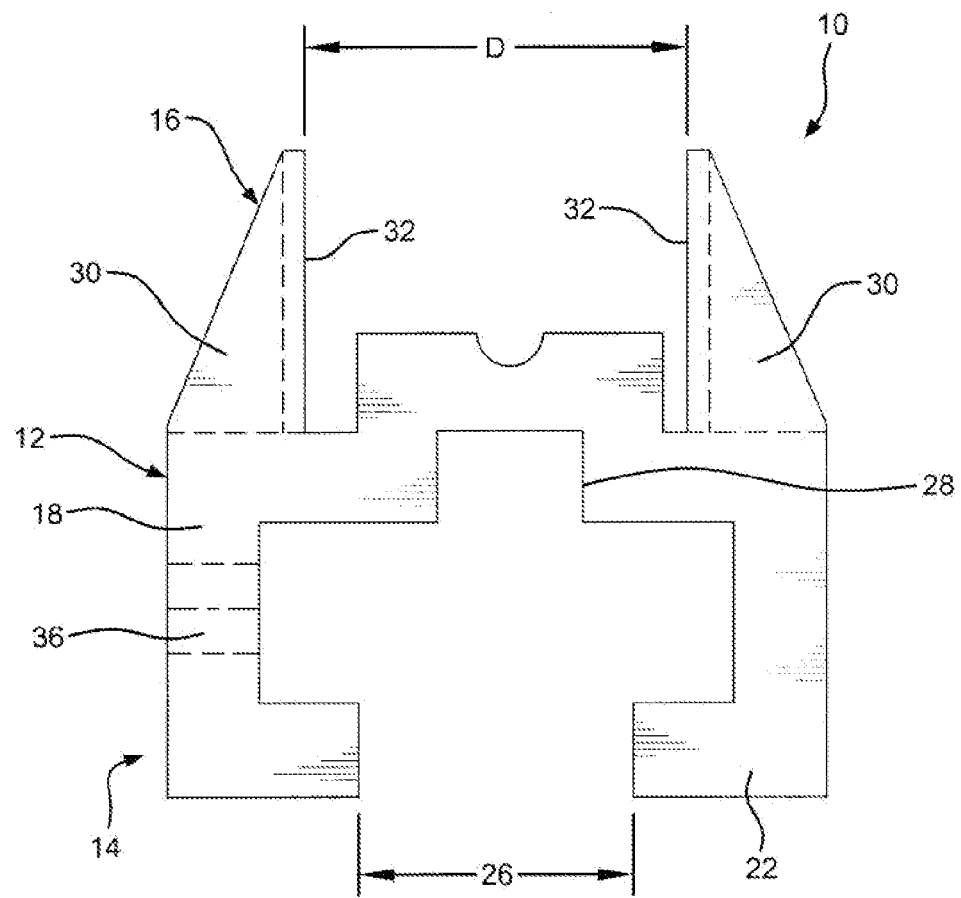
FIG. 3 is a front view of the anti-tipping clamp of FIG. 2.
Figure 4:
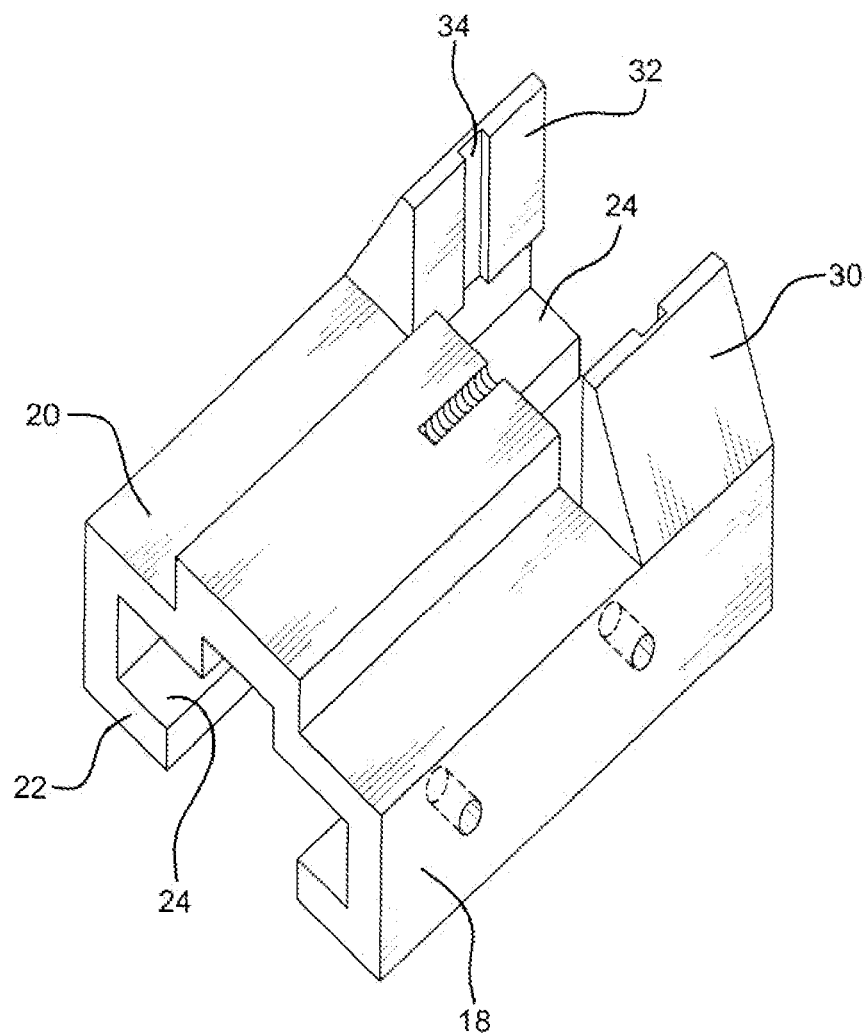
FIG. 4 is an angled view of the anti-tipping clamp of FIG. 2.

Referring now to the figures, an embodiment of the anti-tipping clamp is disclosed that is presently preferred. The clamp 10 includes a body 12 with a rail engagement section 14 and a die tool holder section 16. The rail engagement section 14 includes two side walls 18 that extend downward from a body top wall 20. As illustrated, the side walls are formed integral with the top wall 20 and extend downward from the lateral edges of the top wall such that the side walls 18 are spaced apart from each other. The spacing is selected such that the side walls engage with the side edges of a conventional rail R on a forming machine M.

Locking legs 22 are formed integral with the side walls 18 and are preferably located on the lower distal end of the side walls 18. The locking legs 22 extend inward towards the centerline CL of the body and toward one another from the side walls 18 so as to each form a ledge 24. The locking legs terminate at a location so as to define an opening 26.

A notch or keyway 28 is formed in the bottom surface of the top wall 20 and preferably extends linearly along the entire length of the body. The keyway 28 is designed to engage with a key formed on some conventional rails. As shown in the figures, the keyway is preferably offset from the centerline of the body and the side walls so as to allow for adjustment and locking of the clamp onto a forming machine rail.

The side walls 18, top wall 20, keyway 28 and locking legs 22 are designed to form a channel through the body 12 of the clamp with a defined shape to engage and slidingly mate with a conventional rail R on a press brake machine M. The locking legs 22 and side walls 18 prevent the body from being raised significantly upward or rotated relative to the rail, thus securing the body to the rail.

The die tool holder section 16 includes two spaced apart clamp arms 30 each formed integral with a side wall 18. Each arm 30 preferably includes a substantially vertical jaw face 32 that faces inward toward body centerline CL and the jaw face 32 of the other arm 30. The faces 32 are spaced apart from one another by a distance D which is slightly larger than the defined width of the die tool that is intended to be clamped. While the spacing D of the faces 32 in the illustrated embodiment is less than the rail width, it is also contemplated that the face spacing could be larger to accommodate a wider die tool.

A substantially vertical groove 34 may be formed in each jaw face 32 from an upper edge and extending downward. The groove forms a locking channel for engaging with a protrusion that may be formed on a die tool for securing the die tool to the clamp 10. However, a groove is not necessary in the present invention.

One or more holes 36 may be formed in one or both of the side walls 18. The holes are preferably threaded to receive a locking screw (not shown) which is tightened to lock the clamp 10 to a rail R. The offset of the keyway 28 discussed above is preferably configured so that the locking screw will cause the sidewall and a side surface of the keyway to abut corresponding surfaces on the forming machine rail, thereby securing the clamp to the rail.

In use, the clamp 10 is slid onto an end of a forming machine rail R by sliding the rail through the engagement section 14 of the body 12. The clamp 10 is then moved to the location on the rail where the forming is to take place. One or more locking screws are tightened to temporarily secure the clamp to the rail in the desired location.

A die tool T is then slid down onto the tool holder section 16 by engaging protrusions on the tool with the grooves on the clamp arms 30.

Figure 5A:
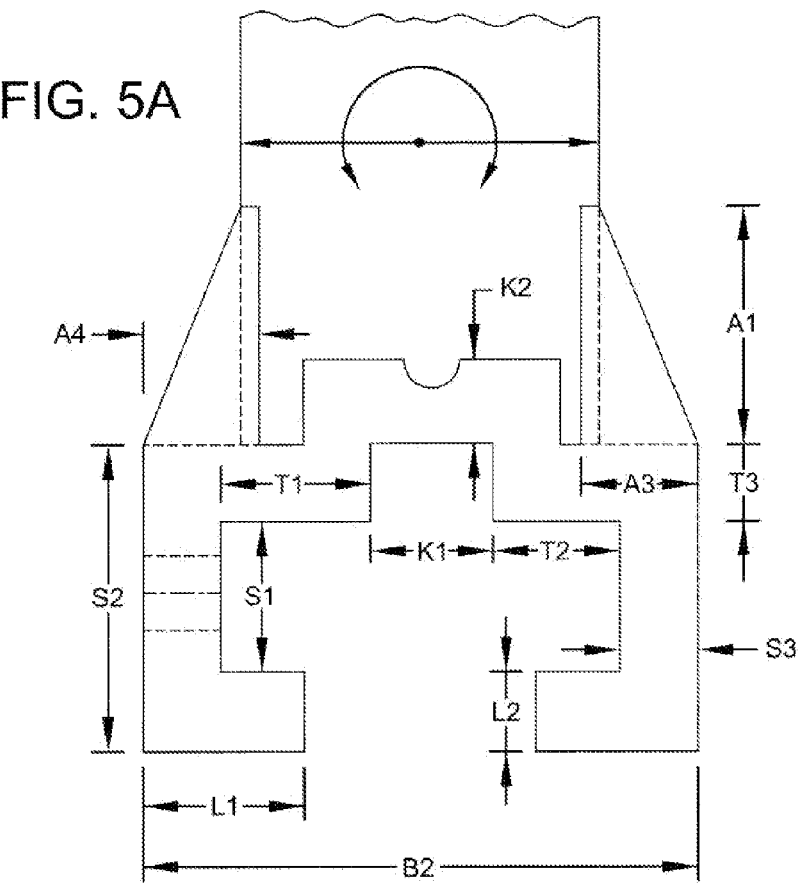
FIG. 5A and FIG. 5B are schematic representations of the loading on a tool that the clamp of the present invention is designed to react.
Figure 5B:
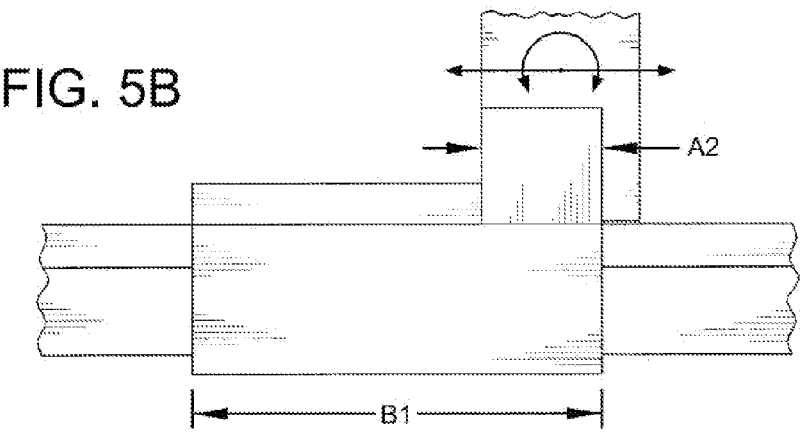

In this configuration, the die tool T is temporarily held by the clamp. As such, offsetting loads that might be applied to the tool T during forming will not result in the tool T falling off the rail. For example, as shown in FIGS. 5A and 5B, the clamp 10 provides support for the tool to counter lateral L, rotational R, and axial A loads that would normally result in the tool T falling off the rail. Each of these loads when applied to a tool secured to the clamp 10 are reacted by the elements of the clamp described above.

The Applicant has determined that the following clamp dimensions (inches) provide a preferred clamp design which prevents tool damage while providing a lightweight and easy to use clamp design. The different dimensions for T1 and T2 are designed into the preferred embodiment of the clamp so as to configure the clamp to fit onto the rail so that the arms are always located on the same side.

| | |
|---|---|
| A1 | 1.07 |
| A2 | 0.787 |
| A3 | 0.620 |
| A4 | 0.638 |
| B1 | 1.880 |
| B2 | 2.697 |
| S1 | 0.430 |
| S2 | 0.938 |
| S3 | 0.250 |
| T1 | 0.820 |
| T2 | 0.785 |
| T3 | 0.258 |
| K1 | 0.592 |
| K2 | 0.250 |
| L1 | 0.500 |
| L2 | 0.250 |

Various embodiments of this invention are described herein. However, it should be understood that the illustrated embodiments are exemplary only, and should not be taken as limiting the scope of the invention.

The invention claimed is:

1. An anti-tipping clamp for use in securing a die tool to a rail to inhibit tipping of the die tool relative to the rail, the clamp comprising:
    a body with a rail engagement section and a die tool holding section, the body having a centerline extending axially along the body;
    the rail engagement section having a top wall and two side walls that are formed integral with the top wall and depend downward from lateral edges of the top wall such that the side walls are spaced apart from one another other, the spacing being selected such that inside surfaces of the side walls are adapted to engage with side edges on a conventional forming machine rail;
    a locking leg is formed on and integral with each side wall at a lower distal end of the side wall, each locking leg extending inward from the inside surface of the side wall towards the centerline of the body such that each leg extends toward the other leg, the locking legs each forming a ledge that is adapted to engage with a lower surface on the forming machine rail so as to secure the rail between the top wall and the locking leg, the locking legs extending inward a predetermined distance so as to define an opening between the terminal ends of each leg;
    a keyway is formed in a bottom surface of the top wall and extends linearly along the entire length of the top wall, the keyway is adapted to engage with a mating key formed on an upper surface of the forming machine rail;
    the side walls, top wall, keyway and locking legs defining a channel through the body, and adapted to inhibit the body from being raised significantly upward or rotated significantly relative to the rail, thus securing the body to the rail;
    the die tool holder section including two spaced apart clamp arms, each arm being formed integral with one of the side walls at an axial end of the side wall, each arm includes a substantially vertical jaw face located on an inwardly facing surface of the arm so that the jaw faces are arranged to face one another on either side of the centerline, the faces being spaced apart from one another by a distance sufficient to accept a die tool, the faces being positioned above a plane that extends rearward from the top wall; and
    wherein the side walls extend axially past an axial end of the top wall and wherein the arms extend upward from the axial end of the side wall.

2. The clamp of claim 1 wherein the jaw faces lie along planes that are located inward from the inside surfaces of the side walls.

3. The clamp of claim 1 wherein the jaw faces lie along planes that are located outward from the inside surfaces of the side walls.

4. The clamp of claim 1 further comprising a vertical groove formed in each jaw face, the vertical groove extending downward from an upper edge of the arm.

5. The clamp of claim 1 wherein the keyway extends along an axis that is laterally offset from the centerline of the body.

6. The clamp of claim 1 wherein inside surface of the sidewalls has a height of approximately 0.43 inches and the center of the keyway is spaced from the inside surface of one sidewall by approximately 1.12 inches and the inside surface of the other sidewall by approximately 1.08 inches.

7. An anti-tipping clamp for use in securing a die tool to a rail to inhibit tipping of the die tool relative to the rail the clamp comprising:
    a body with a rail engagement section and a die tool holding section, the body having a centerline extending axially along the body:
    the rail engagement section having a top wall and two side walls that are formed integral with the top wall and depend downward from lateral edges of the top wall such that the side walls are spaced apart from one another other, the spacing being selected such that inside surfaces of the side walls are adapted to engage with side edges on a conventional forming machine rail;
    a locking leg is formed on and integral with each side wall at a lower distal end of the side wall, each locking leg extending inward from the inside surface of the side wall towards the centerline of the body such that each leg extends toward the other leg, the locking legs each forming a ledge that is adapted to engage with a lower surface on the forming machine rail so as to secure the rail between the top wall and the locking leg, the locking legs extending inward a predetermined distance so as to define an opening between the terminal ends of each leg;
    a keyway is formed in a bottom surface of the top wall and extends linearly along the entire length of the top wall, the keyway is adapted to engage with a mating key formed on an upper surface of the forming machine rail;
    the side walls, top wall, keyway and locking legs defining a channel through the body, and adapted to inhibit the body from being raised significantly upward or rotated significantly relative to the rail, thus securing the body to the rail;
    the die tool holder section including two spaced apart clamp arms, each arm being formed integral with one of the side walls at an axial end of the side wall, each arm includes a substantially vertical jaw face located on an inwardly facing surface of the arm so that the jaw faces are arranged to face one another on either side of the centerline, the faces being spaced apart from one another by a distance sufficient to accept a die tool, the faces being positioned above a plane that extends rearward from the top wall; and wherein the keyway extends along an axis that is laterally offset from the centerline of the body.

8. The clamp of claim 7 wherein the jaw faces lie along planes that are located inward from the inside surfaces of the side walls.

9. The clamp of claim 7 wherein the jaw faces lie along planes that are located outward from the inside surfaces of the side walls.

10. The clamp of claim 7 further comprising a vertical groove formed in each jaw face, the vertical groove extending downward from an upper edge of the arm.

11. The clamp of claim 7 wherein inside surface of the sidewalls has a height of approximately 0.43 inches and the center of the keyway is spaced from the inside surface of one sidewall by approximately 1.12 inches and the inside surface of the other sidewall by approximately 1.08 inches.

12. An anti-tipping clamp for use in securing a die tool to a rail to inhibit tipping of the die tool relative to the rail, the clamp comprising:

a body with a rail engagement section and a die tool holding section, the body having a centerline extending axially along the body;

the rail engagement section having a top wall and two side walls that are formed integral with the top wall and depend downward from lateral edges of the top wall such that the side walls are spaced apart from one another other, the spacing being selected such that inside surfaces of the side walls are adapted to engage with side edges on a conventional forming machine rail, the side walls extend axially past an axial end of the top wall;

a locking leg is formed on and integral with each side wall at a lower distal end of the side wall, each locking leg extending inward from the inside surface of the side wall towards the centerline of the body such that each leg extends toward the other leg, the locking legs each forming a ledge that is adapted to engage with a lower surface on the forming machine rail so as to secure the rail between the top wall and the locking leg, the locking legs extending inward a predetermined distance so as to define an opening between the terminal ends of each leg;

a keyway is formed in a bottom surface of the top wall and extends linearly along the entire length of the top wall, the keyway is adapted to engage with a mating key formed on an upper surface of the forming machine rail, the keyway extending along an axis that is laterally offset from the centerline of the body:

the side walls, top wall, keyway and locking legs defining a channel through the body, and adapted to inhibit the body from being raised significantly upward or rotated significantly relative to the rail, thus securing the body to the rail; and the die tool holder section including two spaced apart clamp arms, each arm being formed integral with one of the side walls at an axial end of the side wall, each arm includes a substantially vertical jaw face located on an inwardly facing surface of the arm so that the jaw faces are arranged to face one another on either side of the centerline. the faces being spaced apart from one another by a distance sufficient to accept a die tool, the faces being positioned above a plane extending rearward from the top wall, the jaw faces each lying along planes that are located inward from the inside surfaces of the side walls.

13. The clamp of claim 12 further comprising a vertical groove formed in each jaw face, the vertical groove extending downward from an upper edge of the arm.

14. The clamp of claim 12 wherein inside surface of the sidewalls has a height of approximately 0.43 inches and the center of the keyway is spaced from the inside surface of one sidewall by approximately 1.12 inches and the inside surface of the other sidewall by approximately 1.08 inches.

\* \* \* \* \*